(12) United States Patent
Ballard et al.

(10) Patent No.: US 9,563,006 B2
(45) Date of Patent: Feb. 7, 2017

(54) LIGHTING ASSEMBLY HAVING ANTI-WETTING COMPONENT INTERPOSED BETWEEN LIGHT GUIDE AND REFLECTOR

(71) Applicant: Rambus Delaware LLC, Brecksville, OH (US)

(72) Inventors: Kevin L. Ballard, Akron, OH (US); Anthony Mazzola, Seven Hills, OH (US); Tyra S. Bulson, Solon, OH (US); Kurt Starkey, Strongsville, OH (US)

(73) Assignee: Rambus Delaware LLC, Brecksville, OH (US)

( * ) Notice: Subject to any disclaimer, the term of this patent is extended or adjusted under 35 U.S.C. 154(b) by 82 days.

(21) Appl. No.: 14/615,852

(22) Filed: Feb. 6, 2015

(65) Prior Publication Data

US 2015/0226902 A1    Aug. 13, 2015

Related U.S. Application Data

(60) Provisional application No. 61/936,936, filed on Feb. 7, 2014.

(51) Int. Cl.
*F21V 8/00* (2006.01)
*F21Y 101/00* (2016.01)

(52) U.S. Cl.
CPC ........... *G02B 6/0065* (2013.01); *G02B 6/0055* (2013.01); *F21Y 2101/00* (2013.01); *G02B 6/0036* (2013.01)

(58) Field of Classification Search
CPC .... G02B 6/0016; G02B 6/0055; G02B 6/0065
USPC ......................................................... 362/624
See application file for complete search history.

(56) References Cited

U.S. PATENT DOCUMENTS

| | | | | |
|---|---|---|---|---|
| 5,641,219 A | * | 6/1997 | Mizobe | G02B 6/0061 362/23.13 |
| 6,322,236 B1 | * | 11/2001 | Campbell | G02B 5/00 362/19 |
| 8,721,152 B2 | * | 5/2014 | Coleman | F21S 8/04 362/249.02 |
| 2008/0232135 A1 | * | 9/2008 | Kinder | G02B 6/0053 362/615 |

* cited by examiner

*Primary Examiner* — Robert May
(74) *Attorney, Agent, or Firm* — Renner, Otto, Boisselle & Sklar, LLP

(57) ABSTRACT

A lighting assembly includes a light guide to propagate light by total internal reflection. A reflector adjacent the second major surface of the light guide includes a reflective surface to reflect extracted light back into the light guide. An anti-wetting component is interposed between the light guide and the reflector and includes opposed major surfaces. At least one of the major surfaces of the anti-wetting component has a high surface roughness. The anti-wetting component is configured to redirect light transmitted therethrough such that an intensity profile of the light output from the first major surface of the light guide is uniform among a first location where the anti-wetting component is in contact with the light guide and the reflector and a second location where the anti-wetting component is not in contact with at least one of the light guide and the reflector.

20 Claims, 7 Drawing Sheets

LIGHTING ASSEMBLY HAVING ANTI-WETTING COMPONENT INTERPOSED BETWEEN LIGHT GUIDE AND REFLECTOR

RELATED APPLICATION DATA

This application claims the benefit of U.S. Provisional Patent Application No. 61/936,936, filed Feb. 7, 2014, the disclosure of which is incorporated herein by reference in its entirety.

BACKGROUND

Light emitting diodes (LEDs) show promise as an energy efficient light source for lighting assemblies. For example, LED-based lighting assemblies have been used for general lighting applications such as light fixtures. Light emitted from the LED light source may be input to a light guide and light extracting elements may extract the light from the light guide. In some embodiments, a reflector may be adjacent the light guide to limit the direction in which light is output from the lighting assembly. But aesthetic deficiencies can be present in such lighting assemblies if the system design is not optimized.

DESCRIPTION

Figure 1:
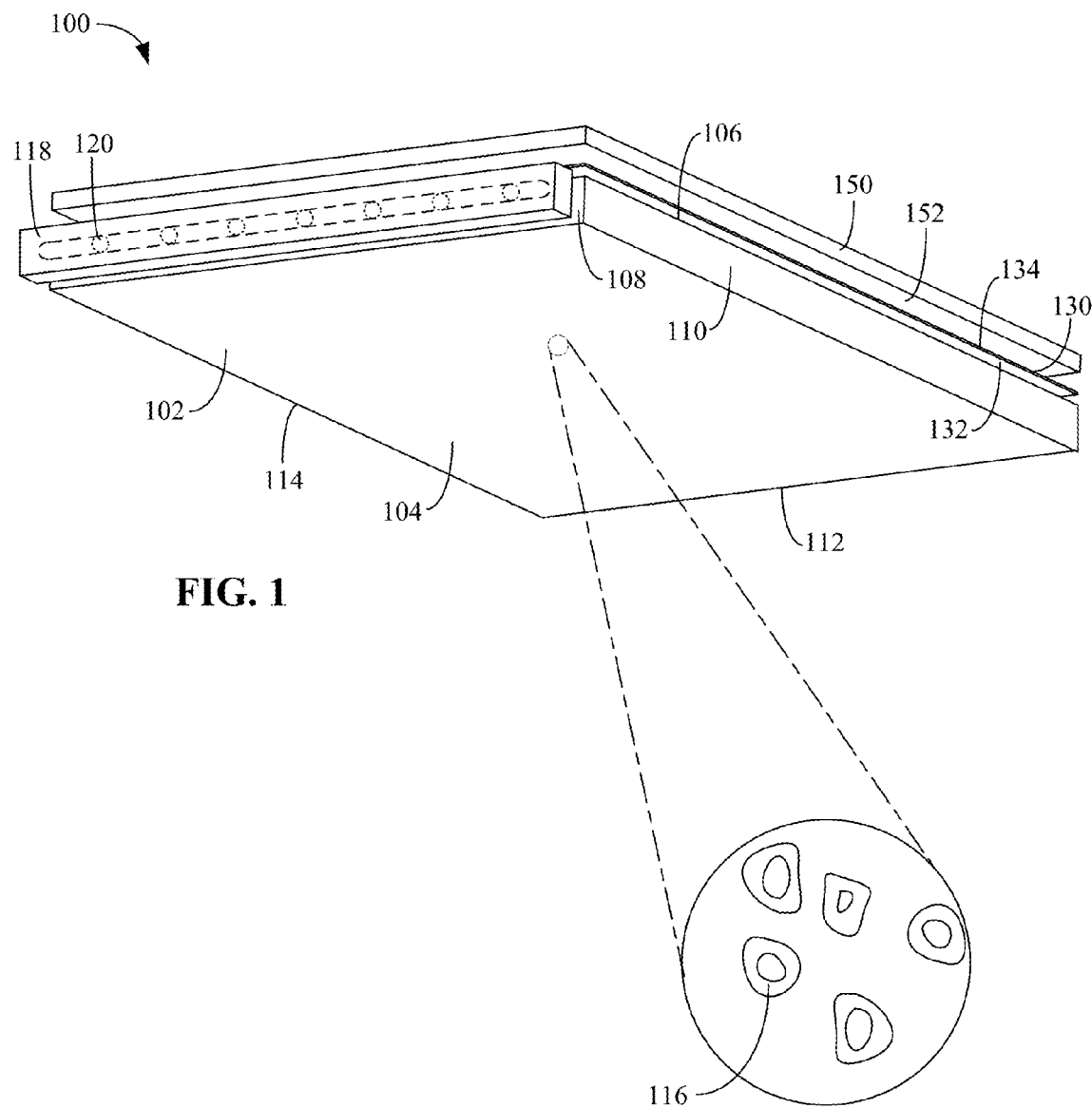
FIG. 1 is a schematic perspective view of an exemplary lighting assembly.

Embodiments will now be described with reference to the drawings, wherein like reference numerals are used to refer to like elements throughout. The figures are not necessarily to scale. Features that are described and/or illustrated with respect to one embodiment may be used in the same way or in a similar way in one or more other embodiments and/or in combination with or instead of the features of the other embodiments. In this disclosure, angles of incidence, reflection, and refraction and output angles are measured relative to the normal to the surface.

In accordance with one aspect of the present disclosure, a lighting assembly includes a light guide to propagate light by total internal reflection. The light guide includes first and second opposed major surfaces and an edge surface extending between the major surfaces in a thickness direction, the edge surface including a light input region through which light is input into the light guide, the light guide further including light extracting elements at at least one of the major surfaces of the light guide, the light extracting elements configured to extract light through at least one of the major surfaces. A reflector is adjacent the second major surface of the light guide. The reflector includes a reflective surface configured to reflect light extracted from the second major surface of the light guide back into the light guide. An anti-wetting component is interposed between the light guide and the reflector. The anti-wetting component includes a first major surface juxtaposed the second major surface of the light guide and a second major surface juxtaposed the reflective surface of the reflector. At least one of the major surfaces of the anti-wetting component has a high surface roughness, the anti-wetting component configured to redirect light extracted from the light guide and transmitted therethrough such that an intensity profile of the light output from the first major surface of the light guide is uniform among a first location where the anti-wetting component is in contact with the light guide and the reflector and a second location where the anti-wetting component is not in contact with at least one of the light guide and the reflector.

Figure 2:
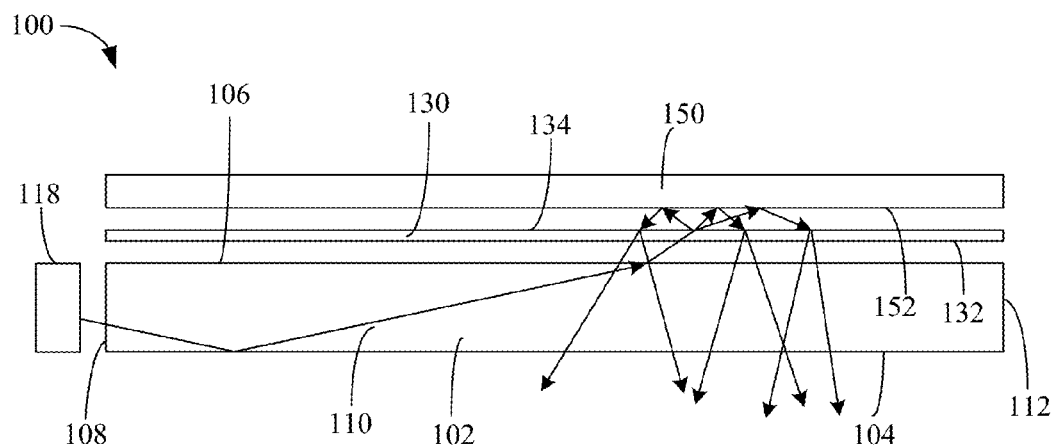
FIG. 2 is a schematic side view of parts of the exemplary lighting assembly of FIG. 1.

With initial reference to FIGS. 1 and 2, an exemplary embodiment of a lighting assembly is shown at 100. The lighting assembly 100 includes a light guide 102. The light guide 102 is a solid article of manufacture made from, for example, polycarbonate, poly(methyl-methacrylate) (PMMA), glass, or other appropriate material. The light guide 102 may also be a multi-layer light guide having two or more layers that may differ in refractive index. The light guide 102 includes a first major surface 104 and a second major surface 106 opposite the first major surface 104. The light guide 102 is configured to propagate light by total internal reflection between the first major surface 104 and the second major surface 106. The length and width dimensions of each of the major surfaces 104, 106 are greater, typically ten or more times greater, than the thickness of the light guide 102. The thickness is the dimension of the light guide 102 in a direction orthogonal to the major surfaces 104, 106. The thickness of the light guide 102 may be, for example, about 0.1 millimeters (mm) to about 10 mm.

At least one edge surface extends between the major surfaces 104, 106 of the light guide in the thickness direction. The total number of edge surfaces depends on the configuration of the light guide. In the case where the light guide is rectangular, the light guide has four edge surfaces 108, 110, 112, 114. Other light guide shapes result in a corresponding number of side edges. Although not shown, in some embodiments, the light guide 102 may additionally include one or more edge surfaces defined by the perimeter of an orifice extending through the light guide in the thickness direction. Each edge surface defined by the perimeter of an orifice extending through the light guide 102 will hereinafter be referred to as an internal edge surface. Depending on the shape of the light guide 102, each edge surface may be straight or curved, and adjacent edge surfaces may meet at a vertex or join in a curve. Moreover, each edge surface may include one or more straight portions connected to one or more curved portions. The edge surface through which light from the light source 118 is input to the light guide will now be referred to as a light input edge. The light input edge includes a light input region through which the light is input. In the embodiment shown in FIG. 1, the edge surface 108 is a light input edge. In some embodiments, the light guide 102 includes more than one light input edge. Furthermore, the one or more light input edges may be straight and/or curved.

In the illustrated embodiment, the major surfaces 104, 106 are planar. In other embodiments, at least a portion of the major surfaces 104, 106 of the light guide 102 is curved in one or more directions. In one example, the intersection of the light input edge 108 and one of the major surfaces 104, 106 defines a first axis, and at least a portion of the light guide 102 curves about an axis orthogonal to the first axis. In another example, at least a portion of the light guide 102 curves about an axis parallel to the first axis. Exemplary shapes of the light guide include a dome, a hollow cylinder, a hollow cone or pyramid, a hollow frustrated cone or pyramid, a bell shape, an hourglass shape, or another suitable shape.

With continued reference to FIG. 1, in some embodiments, the light guide 102 includes light extracting elements 116 in, on, or beneath at least one of the major surfaces 104, 106. Light extracting elements that are in, on, or beneath the major surface 104, 106 will be referred to as being "at" the major surface. Each light extracting element 116 functions to disrupt the total internal reflection of the propagating light that is incident on the light extracting element. In one embodiment, the light extracting elements 116 reflect light toward the opposing major surface so that the light exits the light guide 102 through the opposing major surface. Alternatively, the light extracting elements 116 transmit light through the light extracting elements and out of the major surface of the light guide 102 having the light extracting elements. In another embodiment, both types of light extracting elements 116 are present. In yet another embodiment, the light extracting elements 116 reflect some of the light and refract the remainder of the light incident thereon. Therefore, the light extracting elements 116 are configured to extract light from the light guide 102 through one or both of the major surfaces 104, 106, and light may be similarly extracted through the major surfaces of other light guides described herein.

Exemplary light extracting elements include light-scattering elements, which are typically features of indistinct shape or surface texture, such as printed features, ink jet printed features, selectively-deposited features, chemically etched features, laser etched features, and so forth. In the exemplary embodiment shown in FIG. 1, the light extracting elements 116 are embodied as features formed by laser etching. In an example, these light extracting elements are configured to extract light from the light guide in a lambertian light output distribution such that the apparent brightness of the major surface to an observer is nominally similar regardless of the observer's angle of view. The term "nominally" encompasses variations of one or more parameters that fall within acceptable tolerances in design and/or manufacture. A lambertian light output distribution may be desired in general lighting applications for both function and aesthetics of the lighting assembly. The light-scattering elements are configured to extract light from the light guide in a defined intensity profile (e.g., a uniform intensity profile). In this disclosure, intensity profile refers to the variation of intensity with position within a light-emitting region (such as the major surface or a light output region of the major surface). In an example of the embodiment shown in FIG. 1, the light extracting elements are configured to extract light from the major surface 104 in a uniform intensity profile.

Other exemplary light extracting elements include features of well-defined shape, such as V-grooves, lenticular grooves, and features of well-defined shape that are small relative to the linear dimensions of the major surfaces (e.g., major surfaces 138, 140), which are referred to herein as micro-optical elements. The smaller of the length and width of a micro-optical element is less than one-tenth of the longer of the length and width (or circumference) of the light guide (e.g., light guide 102) and the larger of the length and width of the micro-optical element is less than one-half of the smaller of the length and width (or circumference) of the light guide. The length and width of the micro-optical element is measured in a plane parallel to the major surface (e.g., major surfaces 104, 106) of the light guide for planar light guides or along a surface contour for non-planar light guides.

The micro-optical elements are configured to extract light in a defined intensity profile (e.g., a uniform intensity profile) and in a defined light ray angle distribution from one or both of the major surfaces. In this disclosure, the term light ray angle distribution is used to describe the variation of the intensity of light with ray angle (typically a solid angle) over a defined range of light ray angles. In an example in which the light is emitted from an edge-lit light guide, the light ray angles can range from −90° to +90° relative to the normal to the major surface.

Micro-optical elements are shaped to predictably reflect or refract light. However, one or more of the surfaces of the micro-optical elements may be modified, such as roughened, to produce a secondary effect on light output. Exemplary micro-optical elements are described in U.S. Pat. No. 6,752,505 and, for the sake of brevity, are not described in detail in this disclosure. The micro-optical elements may vary in one or more of size, shape, depth or height, density, orientation, slope angle, or index of refraction such that a desired light output from the light guide is achieved over the corresponding major surface.

Light guides having light-extracting elements are typically formed by a process such as injection molding. The light-extracting elements are typically defined in a shim or insert used for injection molding light guides by a process such as diamond machining, laser etching, laser micromachining, chemical etching, or photolithography. Alternatively, any of the above-mentioned processes may be used to define the light-extracting elements in a master that is used to make the shim or insert. In other embodiments, light guides without light-extracting elements are typically formed by a process such as injection molding or extruding, and the light-extracting elements are subsequently formed on one or both of the major surfaces by a process such as stamping, embossing, laser etching, or another suitable process. Light-extracting elements may also be produced by depositing elements of curable material on the major surfaces of the light guide and curing the deposited material using heat, UV-light, or other radiation. The curable material can be deposited by a process such as printing, ink jet printing, screen printing, or another suitable process. Alternatively, the light-extracting elements may be inside the light guide between the major surfaces (e.g., the light-extracting elements may be light redirecting particles and/or voids disposed within the light guide).

The lighting assembly 100 includes a light source 118 positioned adjacent the light input edge 108. The light source 118 is configured to edge light the light guide 102 such that light from the light source 118 enters the light input edge 108 and propagates along the light guide 102 by total internal reflection at the major surfaces 104, 106.

The light source 118 includes one or more solid-state light emitters 120. The solid-state light emitters 120 constituting the light source 118 are arranged linearly or in another suitable pattern depending on the shape of the light input edge 108 of the light guide 102 to which the light source 118 supplies light.

Exemplary solid-state light emitters 120 include such devices as LEDs, laser diodes, and organic LEDs (OLEDs). In an embodiment where the solid-state light emitters 120 are LEDs, the LEDs may be top-fire LEDs or side-fire LEDs, and may be broad spectrum LEDs (e.g., white light emitters)

or LEDs that emit light of a desired color or spectrum (e.g., red light, green light, blue light, or ultraviolet light), or a mixture of broad-spectrum LEDs and LEDs that emit narrow-band light of a desired color. In one embodiment, the solid-state light emitters 120 emit light with no operably-effective intensity at wavelengths greater than 500 nanometers (nm) (i.e., the solid-state light emitters 120 emit light at wavelengths that are predominantly less than 500 nm). In some embodiments, the solid-state light emitters 120 constituting light source 118 all generate light having the same nominal spectrum. In other embodiments, at least some of the solid-state light emitters 120 constituting light source 118 generate light that differs in spectrum from the light generated by the remaining solid-state light emitters 120. For example, two different types of solid-state light emitters 120 may be alternately located along the light source 120.

The lighting assembly 100 includes a reflector 150 adjacent one of the major surfaces 106, 108 of the light guide 102. The reflector 150 includes a reflective surface 152 facing the major surface of the light guide 102. In some embodiments, the reflective surface 152 is configured to specularly reflect light output from the second major surface 106 and incident thereon. The light extracted through the major surface of the light guide adjacent the reflector is reflected by the reflective surface of the reflector, re-enters the light guide 102 at the major surface, and is output from the light guide 102 through the other major surface. In the exemplary embodiment shown in FIGS. 1 and 2, the reflector 150 is adjacent the second major surface 106 of the light guide 102 and the reflective surface 152 faces the second major surface 106. Accordingly, the reflector 150 limits the direction in which light is output from the lighting assembly 100. This may be advantageous in embodiments of the lighting assembly 100 in which it is desired to output light from only one side (e.g., a ceiling fixture, a wall fixture, a hanging fixture, etc.).

The lighting assembly 100 may include one or more additional components. For example, although not specifically shown in detail, in some embodiments of the lighting assembly, the light source 104 includes structural components to retain the solid-state light emitters 118. In the examples shown in FIG. 1, the solid-state light emitters 118 are mounted to a printed circuit board (PCB) 120. The light source 104 may additionally include circuitry, power supply, electronics for controlling and driving the solid-state light emitters 118, and/or any other appropriate components.

The lighting assembly 100 may additionally include a housing (not shown) for retaining the light source 104, the light guide 102, and the reflector 150. The housing may retain a heat sink or may itself function as a heat sink. In some embodiments, the lighting assembly 100 includes a mounting mechanism (not shown) to mount the lighting assembly to a retaining structure (e.g., a ceiling, a wall, etc.).

While the reflector 150 aids in the control of light output from the lighting assembly 100 by reflecting the light output from the major surface 106 back through the light guide 102, the presence of the reflector 150 can impart visual artifacts to the light guide 102. More specifically, in some embodiments of the lighting assembly 100 in which the reflector 150 is adjacent the light guide, the light guide is viewed by an observer as having a non-uniform light output intensity profile even though the light extracting elements are configured to provide a uniform light output intensity profile. As an example, one or more dark spots are present at the major surface of the light guide as viewed by an observer. This visual effect is also referred to herein as a "wetting" effect.

Wetting is caused when the reflector and the major surface of the light guide are in intimate contact. In some implementations, this contact is caused by gravity. For example, a lighting assembly embodied as a ceiling fixture may include the reflector above the light guide. The force of gravity may cause the reflector to sag and therefore come into contact with the light guide. In other implementations, this contact is caused by imperfections in the components of the lighting assembly. For example, as part of the light guide formation process, an injection molded light guide may be removed from the mold using one or more suction cups. The suction cup may alter the surface to which it attaches by raising the surface. Even a slight raise in the surface of the light guide (e.g., 5 μm) may cause a portion of the light guide to come into contact with the reflector when assembled as part of the lighting assembly. As another example, the light guide and/or the reflector may be bowed or warped, which may cause a portion of the light guide to contact the reflector when assembled as part of the lighting assembly. As another example, the housing for retaining the light guide and the reflector may not provide spacing between the light guide and the reflector, and may cause a portion of the light guide to come into contact with the reflector.

Figure 9:
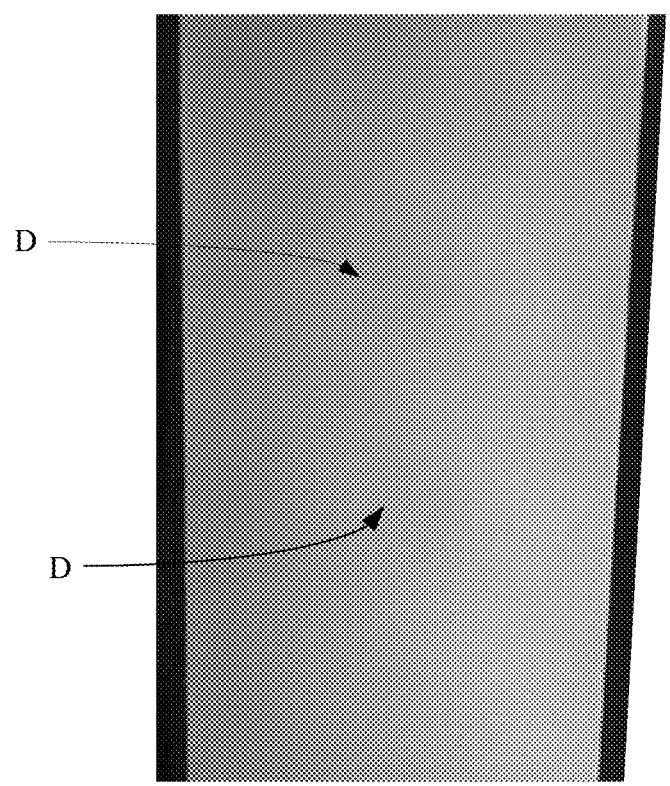
FIG. 9 is an image of an exemplary lighting assembly.

Light propagating in the light guide that is incident this point of contact between the light guide and the reflector will either continue to propagate in the light guide instead of being extracted from the light guide; or will be output from the light guide at a relatively shallow angle. As a result, even in embodiments where the light extracting elements of the light guide are configured to provide a uniform light output intensity profile, the apparent brightness of the major surface as viewed by an observer is not uniform. This wetting effect is exemplified in FIG. 9, which shows a lighting assembly including a light guide and reflector. The light guide has the manufacturing imperfection of protrusions caused by a removal process of the light guide from the mold in which it is formed. In the lighting assembly, the protrusions contact the reflector, and the dark spots D are observed when the lighting assembly is illuminated. These dark spots may also occur due to wetting in embodiments where the light extracting elements are configured to intentionally impart a change in light output intensity over the area of the light guide (e.g., a gradient).

Wetting may be mitigated by providing air gaps between the light guide and the reflector. However, this can lower the efficiency of the lighting assembly. And from a practical standpoint, simply providing an air gap between the light guide and the reflector to a greater distance does not necessarily account for manufacturing imperfections of the components of the lighting assembly and/or gravitational forces acting on the components. Furthermore, in many embodiments, placing an element (e.g., a film or spacer) between the light guide and the reflector in order to space the light guide from the reflector can still result in wetting (e.g., when the element is brought into contact with the light guide and the reflector) or impart other undesired visual effects/artifacts to the light guide 102.

Figure 3:
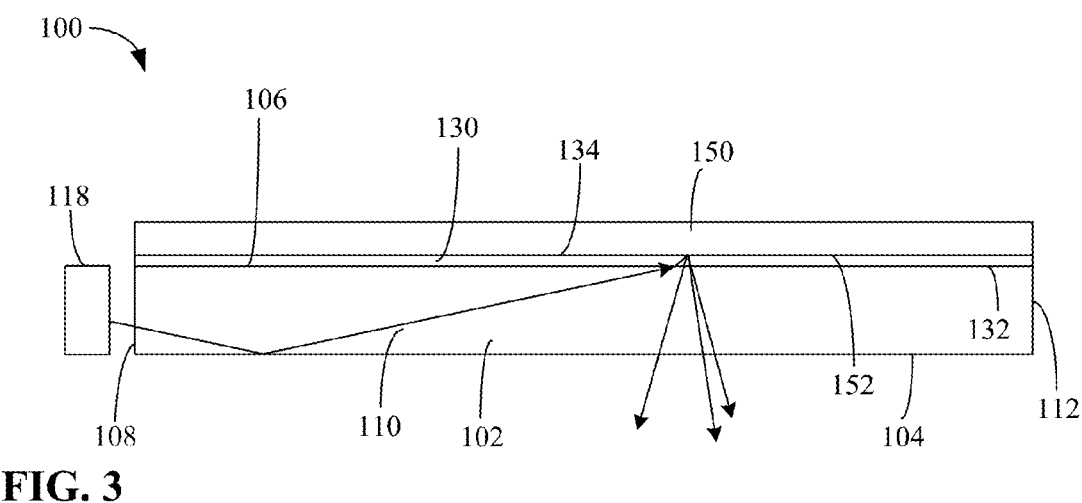
FIG. 3 is a schematic side view of parts of an exemplary lighting assembly.

In accordance with the present disclosure, the lighting assembly includes an anti-wetting component 130 interposed between the light guide 102 and the reflector 150. The anti-wetting component 130 is embodied as a solid article having a first major surface 132 and a second major surface 134 opposite the first major surface 132. As shown in FIGS. 1 and 2, the first major surface 132 of the anti-wetting component 130 is juxtaposed the second major surface 106 of the light guide 102 and the second major surface 134 of the anti-wetting component 130 is juxtaposed the reflective surface 152 of the reflector 150. In the exemplary embodiment shown in FIGS. 1 and 2, the anti-wetting component 130 is spaced apart from the light guide and is spaced apart from the reflector 150 in the thickness direction. Some embodiments of the lighting assembly have this spaced configuration. In other embodiments, the anti-wetting component 130 is in contact with at least a part of the light guide 102 and/or with at least a part of the reflector 150. For example, this contact may be due to the gravitational force and/or one or more design imperfections as described above. In another example, this contact may be by design. FIG. 3 shows an exemplary embodiment of the lighting assembly 100 in which the first major surface 132 of the anti-wetting component 130 is in contact with the second major surface 106 of the light guide; and the second major surface 134 of the anti-wetting component 130 is in contact with the reflective surface 152 of the reflector.

As described below, the anti-wetting component 130 is configured to reduce or eliminate wetting even if the anti-wetting component 130 is in contact with at least a part of the light guide and/or with at least a part of the reflector. As an example, the anti-wetting component 130 is configured to redirect light extracted from the light guide 102 and transmitted therethrough such that an intensity profile of the light output from the first major surface 104 of the light guide 102 is uniform among a first location where the anti-wetting component is in contact with the light guide 102 and the reflector 150 and a second location where the anti-wetting component 130 is not in contact with at least one of the light guide 102 and the reflector 150.

The anti-wetting component 130 is a light transmissive component. Light emitted from the light guide 102 may be transmitted through the anti-wetting component 130 and may be incident on the reflector 150. Similarly, light reflected by the reflector 150 may be transmitted through the anti-wetting component 130 and may re-enter the light guide 102. In some embodiments, the transmissivity of the anti-wetting component 130 is within the range of about 60% to about 90%. In other embodiments, the transmissivity of the anti-wetting component 130 is within the range of about 70% to about 90%. In other embodiments, the transmissivity of the anti-wetting component 130 is within the range of about 70% to about 80%. If the transmissivity of the anti-wetting component is too low, the efficiency of the lighting assembly would be undesirably lowered.

The overall shape of the anti-wetting component 130 corresponds to the overall shape of the light guide 102. For example, in the illustrated embodiment where the light guide 102 is rectangular in shape, the anti-wetting component 130 is also rectangular in shape. The length and width dimensions of each of the major surfaces 132, 134 of the anti-wetting component 130 respectively correspond to the length and width dimensions of at least one of the major surfaces 104, 106 of the light guide 102 (e.g., the second major surface 106).

The length and width dimensions of each of the major surfaces 132, 134 of the anti-wetting component 130 are greater, typically ten or more times greater, than the thickness of the anti-wetting component 130. The thickness is the dimension of the anti-wetting component 130 in a direction orthogonal to the major surfaces 132, 134. The thickness of the anti-wetting component may be thin enough to allow for use in various lighting assemblies between the light guide and the reflector, but thick enough to provide a desired transmission haze. In some embodiments, the thickness of the anti-wetting component 130 is within the range of about 50 µm to about 300 µm. In other embodiments, the thickness of the anti-wetting component 130 is within the range of about 150 µm to about 300 µm. In other embodiments, the thickness of the anti-wetting component 130 is within the range of 150 µm to 250 µm. In other embodiments, the thickness of the anti-wetting component 130 is within the range of about 150 µm to about 200 µm. In other embodiments, the thickness of the anti-wetting component 130 is within the range of about 200 µm to about 250 µm. In other embodiments, the thickness of the anti-wetting component 130 is within the range of about 50 µm to about 100 µm.

At least one of the major surfaces 132, 134 of the anti-wetting component 130 has a high surface roughness. In this disclosure, the term "high surface roughness" refers to a defined surface roughness suitable for imparting a diffuse component to incident light that is reflected or refracted. The high surface roughness is a defined roughness intentionally imparted to the major surface of the anti-wetting component. In some embodiments, the high surface roughness is an average surface roughness ($R_a$) of about 5 µm to about 20 µm as measured in an area of 0.001 mm$^2$. In other embodiments, the high surface roughness is an average surface roughness ($R_a$) of about 5 µm to about 15 µm as measured in an area of 0.001 mm$^2$. In other embodiments, the high surface roughness is an average surface roughness ($R_a$) of about 10 µm to about 15 µm as measured in an area of 0.001 mm$^2$. If the surface roughness of both the major surfaces is too low, this can result in a relatively specular transmittance of the incident light, which in-turn may lead to wetting if the component is brought into contact with the light guide and/or the reflector in the lighting assembly. If the surface roughness of one or both of the surfaces is too high, this can result in an undesired decrease in efficiency of the lighting assembly.

In some embodiments, the high surface roughness is provided over the entirety of the major surface of the anti-wetting component. In other embodiments, the high surface roughness is provided in a predetermined or random pattern of shapes (e.g., dots) at the major surface 140 of the substrate.

In some embodiments, one of the major surfaces 132, 134 of the anti-wetting component 130 has a surface roughness that is lower than the high surface roughness of the other of the major surfaces. The major surface of the anti-wetting component 130 having the lower surface roughness may or may not impart a diffuse component to incident light that is transmitted through the anti-wetting component. In some embodiments, the major surface of the anti-wetting component having the lower surface roughness has an average surface roughness ($R_a$) of less than about 10 µm as measured in an area of 0.001 mm$^2$. In other embodiments, the major surface of the anti-wetting component having the lower surface roughness has an average surface roughness ($R_a$) of less than about 5 µm as measured in an area of 0.001 mm$^2$. In other embodiments, the major surface of the anti-wetting component having the lower surface roughness has an average surface roughness ($R_a$) of less than about 3 µm as measured in an area of 0.001 mm$^2$.

In some embodiments, the surface roughness that is lower than the high surface roughness is provided over the entirety of the major surface of the anti-wetting component. In other embodiments, the surface roughness that is lower than the high surface roughness is provided in a predetermined or random pattern of shapes (e.g., dots) at the major surface 140 of the substrate.

As described above, at least a portion of one of the major surfaces 132, 134 of the anti-wetting component 130 has a high surface roughness that imparts a diffuse component to incident light that is transmitted therethrough. The anti-wetting component is configured to redirect at least a portion of the light transmitted therethrough. A transmission haze (i.e., the percentage of light diffusely scattered compared to the total light transmitted) is associated with the light transmitted through the anti-wetting component 130. In some embodiments, the transmission haze of the anti-wetting component 130 is in the range of about 50% to about 90%. In other embodiments, the transmission haze of the anti-wetting component 130 is in the range of about 60% to about 90%. In other embodiments, the transmission haze of the anti-wetting component 130 is in the range of about 70% to about 90%. In other embodiments, the transmission haze of the anti-wetting component 130 is in the range of about 80% to about 90%. If the transmission haze of the anti-wetting component 130 is too low, this can result in the specular transmittance of the incident light, which in-turn may lead to wetting if the component is brought into contact with the light guide and/or the reflector in the lighting assembly. If the transmission haze of the anti-wetting component is too high, this can result in an undesired decrease in efficiency of the lighting assembly.

In some embodiments, the anti-wetting component may be embodied as a single-layer solid article. As an example (not specifically shown), the anti-wetting component may include a substrate with at least one of its major surfaces having a high surface roughness. In other embodiments, the anti-wetting component is embodied as a multi-layer solid article. As an example, the anti-wetting component may include a substrate having one or more additional layers provided thereon. These one or more additional layers may impart a desired surface roughness and/or optical property to the anti-wetting component. The layers of the anti-wetting component may be layered in the thickness direction of the anti-wetting component.

Figure 4:
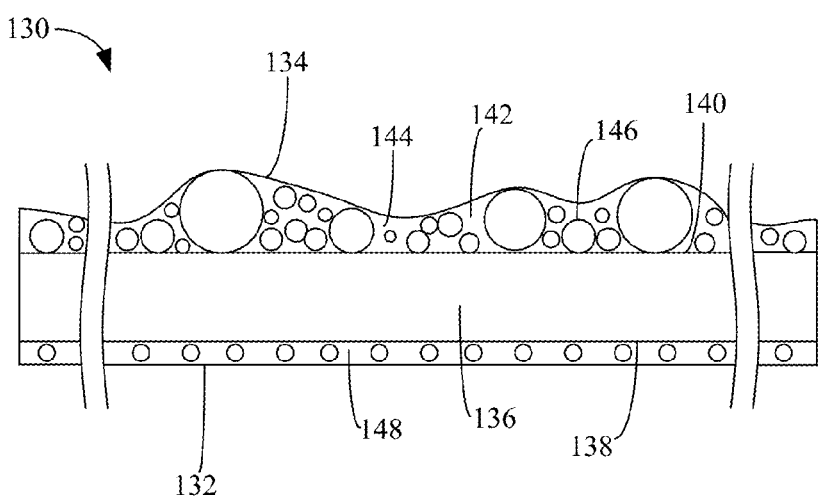
FIG. 4 is a schematic side view of an exemplary anti-wetting component.

FIG. 4 shows an exemplary anti-wetting component 130 embodied as a multi-layer solid article. The exemplary anti-wetting component 130 includes a substrate layer 136, a textured layer 142, and an additional coating layer 148. It will be appreciated that in other exemplary embodiments, the anti-wetting component 130 may include additional or fewer layers. For example, in some embodiments, the multi-layer anti-wetting component shown in FIG. 3 is provided without the additional coating layer 148.

The substrate layer 136 may be a solid article made from, for example, polyethylene terephthalate (PET), polycarbonate, poly(methyl-methacrylate) (PMMA), glass, or other appropriate material. The substrate layer 136 includes a first major surface 138 and a second major surface 140 opposite the first major surface 138. In some embodiments, the substrate layer 136 is configured to support one or more layers at its major surfaces 138, 140.

The textured layer 142 is provided at the second major surface 140 of the substrate layer 136. The textured layer 142 may be made from a transmissive material 144, for example, a UV-curable resin, a UV-curable printing ink, a thermoset printing ink, or other appropriate material. The textured layer 142 has a textured surface embodied as a high surface roughness suitable for imparting a diffuse component to incident light that is transmitted through the anti-wetting component 130. In some embodiments, the transmissive material 144 is patterned to provide the defined high surface roughness. In some embodiments, the textured layer 142 includes transmissive particles 146 such as acrylate, polyethylene, polypropylene, polystyrene, glass, alumina or silica particles. For example, the textured layer may be formed from a UV-curable resin including transmissive particles dispersed therein. The transmissive particles 146 may impart a surface roughness to textured layer and/or may act as diffusion additives. In some embodiments, the transmissive particles may have an average diameter of 1 µm to 25 µm. FIG. 3 schematically shows transmissive particles dispersed in the textured layer 142.

The textured layer 142 may be provided in any suitable arrangement on the substrate layer. FIG. 4 shows that in some embodiments, the textured layer is provided as a continuous layer over the surface of the substrate layer. In such embodiments, the outermost surface of the diffusive layer forms the entirety of the major surface of the anti-wetting component. In other embodiments (not shown), the textured layer 142 is provided as a predetermined or random pattern of shapes (e.g., dots) at the major surface 140 of the substrate. In such embodiments, the outermost surface of the diffusive layer forms a portion of the major surface of the anti-wetting component.

Figure 5:
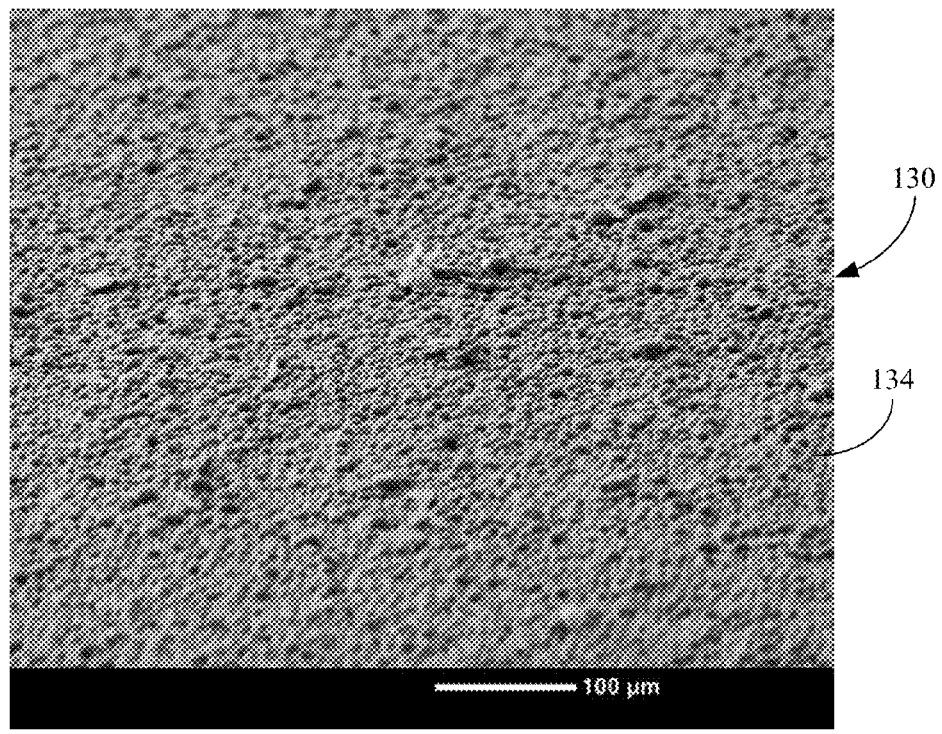
FIGS. 5-8 are scanning electron microscope ("SEM") images of an exemplary anti-wetting component.
Figure 6:
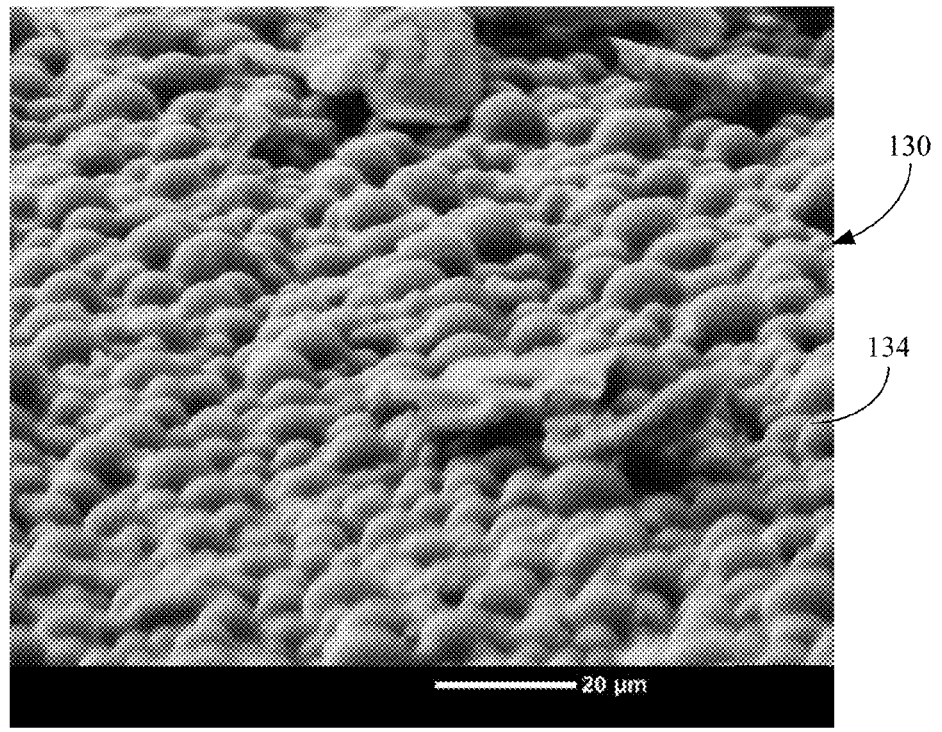

FIGS. 5 and 6 show SEM images of an exemplary diffusive layer of the anti-wetting component. As shown, the diffusive layer forms a textured surface that constitutes a high surface roughness.

The additional coating layer 148 is provided at the first major surface 138 of the substrate layer 136. In some embodiments, the additional coating layer 148 is made from a transmissive material, for example, a UV-curable resin, a UV-curable printing ink, a thermoset printing ink, or other appropriate material. In some embodiments, the additional coating layer 148 has a textured surface (e.g., embodied as a high surface roughness or as a surface having a roughness less than the high surface roughness of the textured layer) suitable for imparting a diffuse component to incident light that is transmitted through the anti-wetting component 130. In other embodiments, the additional coating layer 148 is configured as an anti-stick layer to prevent the anti-wetting component 130 from sticking to the major surface of the light guide. In some embodiments, the additional coating layer includes transmissive particles such as acrylate, polyethylene, polypropylene, polystyrene, glass, alumina or silica particles.

The additional coating layer 148 may be provided in any suitable arrangement on the substrate layer. FIG. 4 shows that in some embodiments, the additional coating layer 148 is provided as a continuous layer over the surface of the substrate layer. In such embodiments, the outermost surface of the additional coating layer 148 forms the entirety of the major surface of the anti-wetting component. In other embodiments (not shown), the additional coating layer 148 is provided as a predetermined or random pattern of shapes (e.g., dots) at the major surface 140 of the substrate. In such embodiments, the outermost surface of the additional coating layer 148 forms a portion of the major surface of the anti-wetting component.

Figure 7:
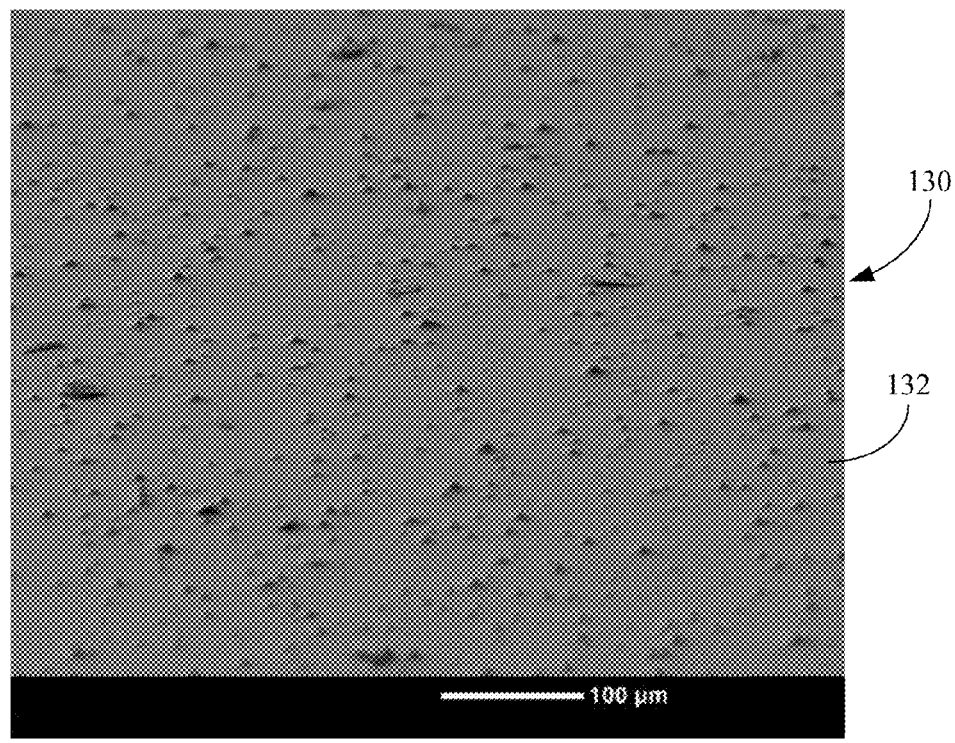
Figure 8:
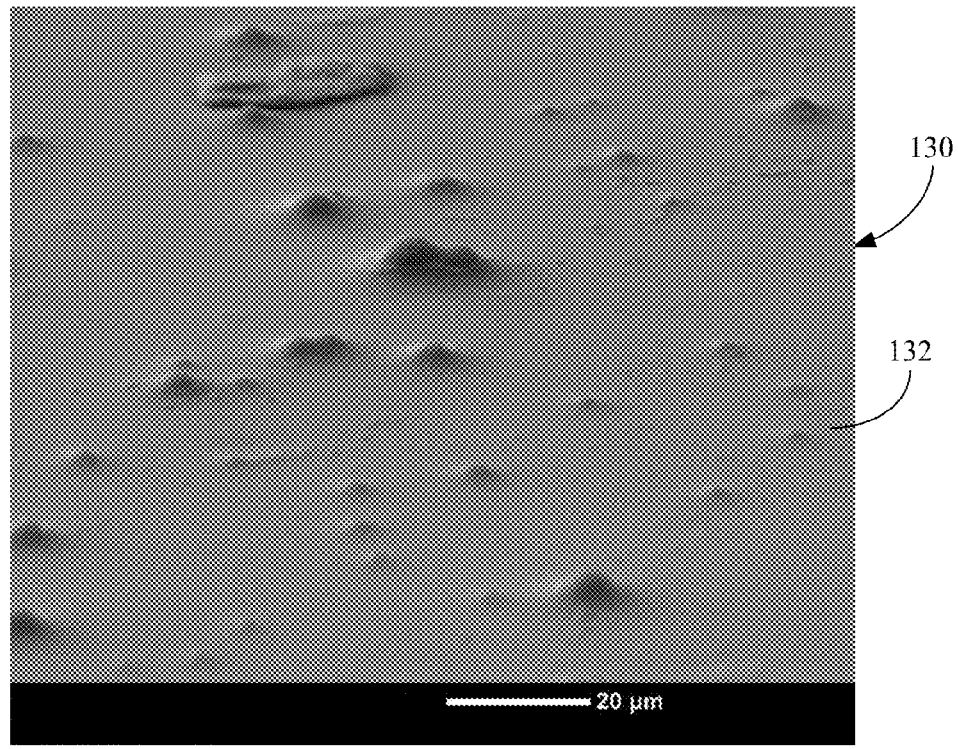

FIGS. 7 and 8 show SEM images of an exemplary additional coating layer of the anti-wetting component. As shown, the additional coating layer provides a surface roughness that is less than that the high surface roughness formed by the textured layer.

In some embodiments, the anti-wetting component is formed by a cast-and-cure manufacturing method. In such an embodiment, a UV curable resin is coated on the major surface of the substrate. The UV curable resin may be patterned (i.e., "cast") by bringing the resin into contact with a textured roll (e.g., by passing the UV curable resin coated substrate together with the textured roll through a pair of nip rollers). After the pattern from the textured roll is imparted to the UV curable resin, the UV curable resin is cured (e.g., by passing the UV curable resin coated substrate by one or more UV curing lamps). In some examples, the textured roll is separated from the patterned UV curable resin prior to the UV curing. In other examples, the textured roll is separated from the patterned UV curable resin prior to the UV curing.

In other embodiments, the anti-wetting component is formed by printing process. As an example, a UV printing ink is printed to the major surface of the substrate and subsequently subjected to a UV curing process. As another example, a thermosetting printing ink is printed to the major surface of the substrate and subsequently subjected to a heat treatment.

In other embodiments, the anti-wetting component is formed using a chemical etchant. As an example, a chemical etchant (e.g., an acid) is brought into contact with the major surface of the substrate for the time needed to obtain the defined roughening of the major surface. Following chemical etching, the etchant is removed, e.g., by washing.

FIGS. 2 and 3 schematically exemplify the effect provided by the anti-wetting component on light extracted from the light guide and incident thereon. As shown, light is input to and propagates in the light guide 102. Light extracted from the second major surface 106 of the light guide 102 is incident on the major surface 132 of the anti-wetting component 130 and is transmitted therethrough. The anti-wetting component 130 (e.g., at least the textured layer) redirects a portion of the light passing therethrough, thereby imparting a diffuse component to the light. The light transmitted through the anti-wetting component is incident on the reflector and is reflected back towards the anti-wetting component. The light is incident on the major surface 134 of the anti-wetting component is further redirected when it is transmitted through the anti-wetting component. The light re-enters the light guide 102 at the second major surface 106, and is output from the light guide 102 through the first major surface 104.

The anti-wetting component 130 is configured to redirect light transmitted therethrough such that an intensity profile of the light output from the lighting assembly (e.g., from the first major surface of the light guide) is uniform among a location where the anti-wetting component is in contact with the light guide and the reflector and another location where the anti-wetting component is not in contact with at least one of the light guide and the reflector. As an example, the anti-wetting component may provide a lambertian light output distribution from the lighting assembly at locations where the anti-wetting component 130 is in contact with the light guide 102 and the reflector 150. By including the anti-wetting component 130 in the lighting assembly, the wetting effect that would otherwise be present due to contact between the reflector and the major surface of the light guide is reduced or eliminated. As a result, in some embodiments, the light output from the lighting assembly 100 will be viewed by an observer as having a uniform intensity profile.

Figure 10:
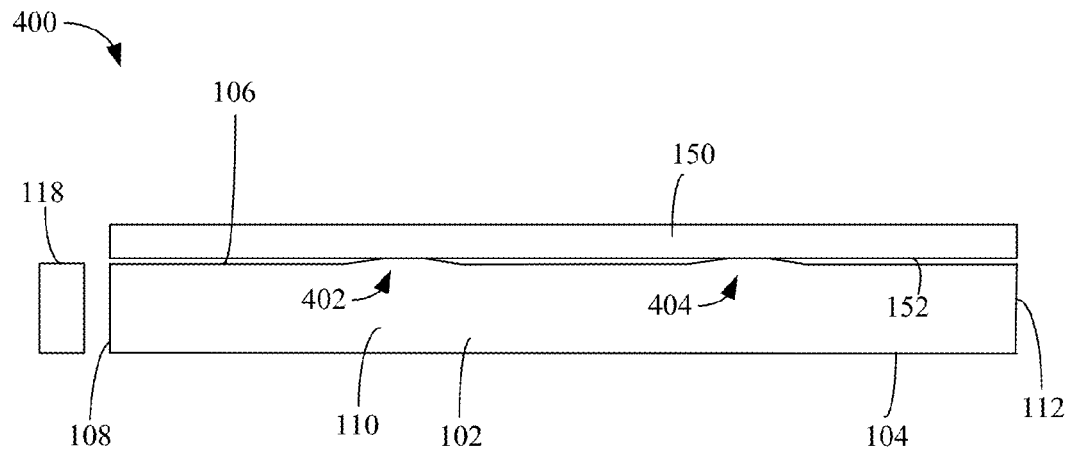
FIGS. 10 and 11 are schematic side views of parts exemplary lighting assemblies.
Figure 11:
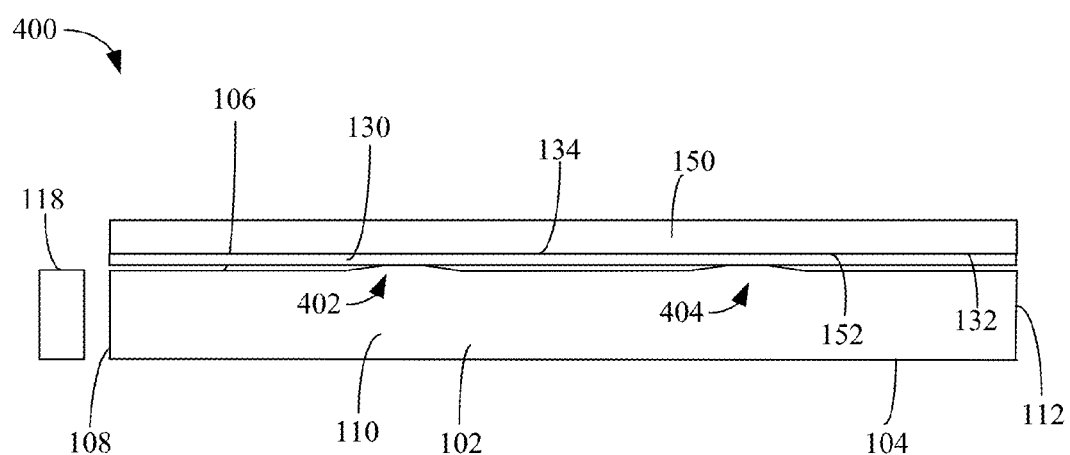

The following example demonstrated that the anti-wetting component of the present disclosure also does not significantly affect the optical performance of the lighting assembly. Specifically, with reference to FIGS. 10 and 11, a lighting assembly 400 embodied as a ceiling light fixture is tested both with and without an anti-wetting component 130. FIG. 10 shows the lighting assembly 400 without the anti-wetting component 130. FIG. 11 shows the lighting assembly 400 with the anti-wetting component 130. In this embodiment, the major surfaces of the components of the light guide that face downward from the ceiling toward the floor may also be referred to as "bottom" major surfaces. The major surfaces of the components of the anti-wetting component that face upward in a direction away from the floor may also be referred to as "top" major surfaces.

The lighting assembly 400 of the example includes a light guide having a width of 1 ft. and a length of 4 ft. The light guide is formed from PMMA and includes light extracting elements (not shown) that are configured to provide a lambertian light output distribution with a uniform intensity profile. The light guide has been formed by injection molding, and suction cups used to remove the light guide from the mold have imparted raised segments 402, 404 of the top major surface 106. The protrusions have a height of about 5 µm in the thickness direction of the light guide 102.

A reflector 150 is adjacent the top major surface 106 of the light guide 102. The reflector 150 includes a reflective surface 150 juxtaposed the top major surface 106 of the light guide 102. As shown in FIG. 10, for the lighting assembly that does not include the anti-wetting component, the light guide 102 and the reflector are arranged so that the protrusions 402, 404 of the top major surface 106 of the light guide make contact the reflective surface 152 of the reflector 150 at respective locations. At other locations along the major surface 106 of the light guide, the top major surface 106 of the light guide does not contact the reflective surface 152 of the reflector 150.

A light source 118 is positioned adjacent the light input edge of the light guide 102. The light source 118 is configured to edge light the light guide 102 such that light from the light source 118 enters the light input edge 108 and propagates along the light guide 102 by total internal reflection at the major surfaces 104, 106.

Figure 12:
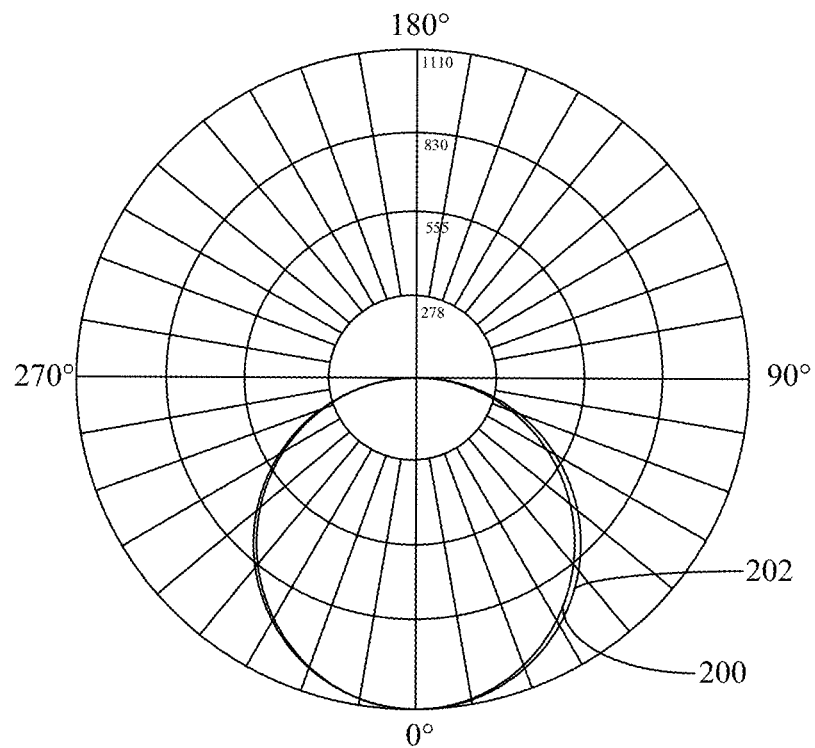
FIGS. 12 and 13 are output distribution profiles of exemplary lighting assemblies.

The edge lit lighting assembly that does not include the anti-wetting component was tested using a goniophotometer. FIG. 12 shows an output distribution profile showing far-field light ray angle distributions of the light extracted from the lighting assembly that does not include the anti-wetting component. The degree scale shown in FIG. 12 represents an azimuth relative to the normal of the major surface 104, 106. The output distribution profile 200 shows the light distribution in a first plane orthogonal to the light input edge 108 and to the major surfaces 104, 106 of the light guide 102. For this distribution 200, the light source 118 is arranged adjacent the light input edge 108 proximate 270°, the major surface 106 is arranged proximate 180°, and the major surface 104 is arranged proximate 0°. The output distribution profile also shows the light distribution 202 in a second plane orthogonal to the side edges 110, 112 and to the major surfaces 104, 106 of the light guide 102. For this distribution 202, the major surface 106 is arranged proximate 180°, the major surface 104 is arranged proximate 0°, and the light source 118 is arranged normal to the plane of the page. As shown in FIG. 12, the lighting assembly that does not include the anti-wetting component possesses lambertian output distribution profiles 200, 202

Table 1, reproduced below, shows the zonal lumen summary of the lighting assembly 400. For this summary, the major surface 104 is arranged proximate 0° and the side edge 108, 110, 112, 114 is arranged proximate 90°. In the particular embodiment, the target is for 75.00% of the total lumens of the lighting fixture to be present in the 0-60° zone. As shown in Table 1, the total lumens of the lighting fixture that does not include the anti-wetting component is 78.10% in the 0-60° zone.

Table 2, reproduced below, shows the spacing criteria of the lighting assembly 400. The target spacing criteria is 1.0-2.0 for each of the 0-180° spacing criterion and the 90-270° spacing criterion. As shown in Table 2, the spacing criteria of the lighting fixture that does not include the anti-wetting component is 1.30 and 1.28, respectively.

As described above, the lighting assembly that does not include the anti-wetting component possesses lambertian output distribution profiles 200, 202; and meets requisite zonal lumen and spacing parameters. However, dark spots were observed in the light guide at those areas where the major surface of the light guide was in contact with the reflective surface of the reflector (see, e.g., FIG. 9, dark spots D).

TABLE 1

Zonal lumen summary of lighting assembly

| | Without Anti-Wetting Component | | With Anti-Wetting Component | |
|---|---|---|---|---|
| Zone | Lumens | % Fixt | Lumens | % Fixt |
| 0-20° | 406.00 | 12.40% | 382.00 | 11.80% |
| 0-30° | 865.76 | 26.50% | 825.11 | 25.40% |
| 0-40° | 1426.07 | 43.60% | 1383.12 | 42.50% |
| 0-60° | 2553.44 | 78.10% | 2544.27 | 78.20% |
| 0-80° | 3204.93 | 98.00% | 3191.49 | 98.10% |
| 0-90° | 3270.37 | 100.00% | 3254.65 | 100.00% |

TABLE 2

Spacing criteria of lighting assembly

| | Without Anti-Wetting Component | With Anti-Wetting Component |
|---|---|---|
| Spacing Criterion (0-180°) | 1.30 | 1.40 |
| Spacing Criterion (90-270°) | 1.28 | 1.32 |

FIG. 11 shows an embodiment of the lighting assembly 400 that includes an anti-wetting component 130 between the light guide 102 and the reflector 150. The anti-wetting component 130 has a multilayer structure similar to that described above with respect to FIG. 4. The anti-wetting component is a 1 ft. by 4 ft. rectangular component having a thickness of 117.0 μm. The transmissivity of the anti-wetting component is 88.5%. The textured layer defines the second major surface 134 and has an average surface roughness ($R_a$) of 13 μm. The additional coating layer defines the first major surface 132 and has an average surface roughness ($R_a$) of 9 μm.

The anti-wetting component 130 is disposed between the light guide 102 and the reflector 150 such that the second major surface 134 is adjacent the reflective surface 152 of the reflector 150 and the first major surface 132 is adjacent the second major surface 106 of the light guide 102. The protrusions 402, 404 of the top major surface 106 of the light guide 102 make contact the anti-wetting component 130, and the reflective surface 152 of the reflector 150 makes contact with at least a portion of the anti-wetting component. A location where the anti-wetting component is in contact with the top major surface 106 of the light guide 102 and the reflective surface 152 of the reflector 150 may be considered a first location. The other locations where the anti-wetting component is not in contact with the top major surface 106 of the light guide 102 (but may or may not be in contact with the reflective surface 152 of the reflector 150) may be considered a second location.

Figure 13:
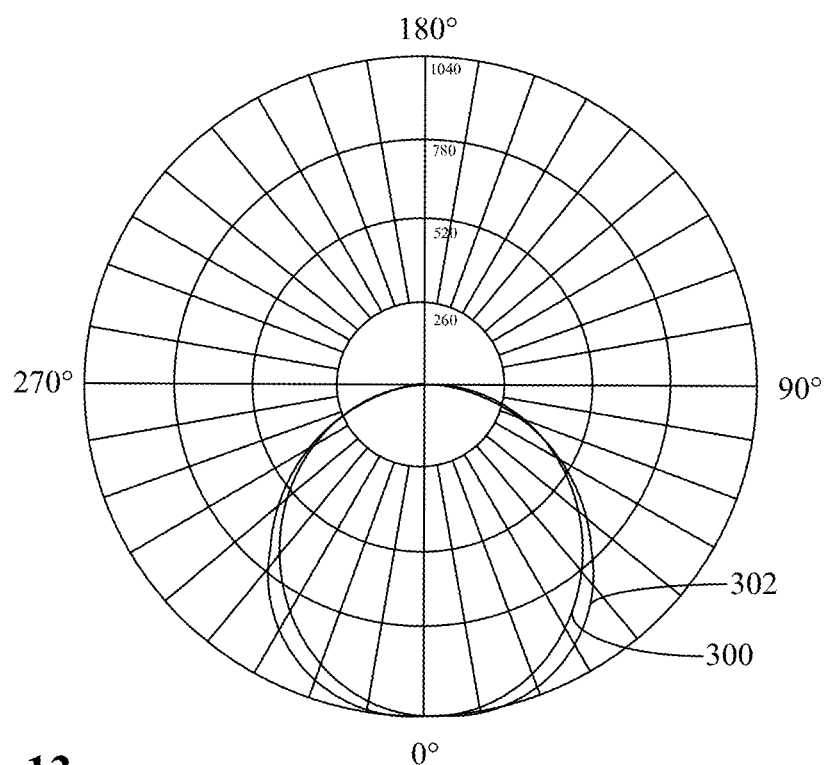

The edge lit lighting assembly that includes the anti-wetting component was tested using a goniophotometer. FIG. 13 shows an output distribution profile showing far-field light ray angle distributions of light extracted from the lighting assembly that includes the anti-wetting component. The degree scale shown in FIG. 13 represents an azimuth relative to the normal of the major surface 104, 106. The output distribution profile 300 shows the light distribution in a first plane orthogonal to the light input edge 108 and to the major surfaces 104, 106 of the light guide 102. For this distribution 300, the light source 118 is arranged adjacent the light input edge 108 proximate 270°, the major surface 106 is arranged proximate 180°, and the major surface 104 is arranged proximate 0°. The output distribution profile also shows the light distribution 302 in a second plane orthogonal to the side edges 110, 112 and to the major surfaces 104, 106 of the light guide 102. For this distribution 302, the major surface 106 is arranged proximate 180°, the major surface 104 is arranged proximate 0°, and the light source 118 is arranged normal to the plane of the page. As shown in FIG. 13, the lighting assembly that includes the anti-wetting component possesses similar lambertian output distribution profiles 300, 302 as compared with those output distribution profiles 200, 202 of the lighting assembly that does not include the anti-wetting component.

Table 1 shows the zonal lumen summary of the lighting assembly 400. As shown, the zonal lumen summary for the lighting assembly that includes the anti-wetting component 130 is similar the zonal lumen summary of the lighting assembly that does not include the anti-wetting component. Also, the lighting assembly that includes the anti-wetting component meets the target of 75.00% of the total lumens of the lighting fixture in the 0-60° zone.

Table 2 shows the spacing criteria of the lighting assembly 400. As shown, the spacing criteria for the lighting assembly that includes the anti-wetting component 130 is similar the spacing criteria of the lighting assembly that does not include the anti-wetting component. Also, the lighting assembly that includes the anti-wetting component meets the target spacing criteria is 1.0-2.0 for each of the 0-180° spacing criterion and the 90-270° spacing criterion.

As demonstrated from the example, the anti-wetting component 130 has not significantly affected the optical performance of the fixture. In addition, the dark spots observed in the lighting assembly that does not include the anti-wetting component were not observed in the lighting fixture that includes the anti-wetting component. That is, the intensity profile of the light output from the bottom major surface of the light guide was observed to be uniform among the first location where the anti-wetting component is in contact with the light guide and the reflector and the second location where the anti-wetting component is not in contact with the light guide.

In this disclosure, the phrase "one of" followed by a list is intended to mean the elements of the list in the alternative. For example, "one of A, B and C" means A or B or C. The phrase "at least one of" followed by a list is intended to mean one or more of the elements of the list in the alternative. For example, "at least one of A, B and C" means A or B or C or (A and B) or (A and C) or (B and C) or (A and B and C).

What is claimed is:

1. A lighting assembly, comprising:
   a light guide to propagate light by total internal reflection, the light guide comprising first and second opposed major surfaces and an edge surface extending between the major surfaces in a thickness direction, the edge surface comprising a light input region through which light is input into the light guide, the light guide further comprising light extracting elements at at least one of the major surfaces of the light guide, the light extracting elements configured to extract light through at least one of the major surfaces;

a reflector adjacent the second major surface of the light guide, the reflector comprising a reflective surface configured to reflect light extracted from the second major surface of the light guide back into the light guide; and an anti-wetting component interposed between the light guide and the reflector, the anti-wetting component comprising a first major surface juxtaposed the second major surface of the light guide and a second major surface juxtaposed the reflective surface of the reflector, at least one of the major surfaces of the anti-wetting component having a high surface roughness, the anti-wetting component configured to redirect light extracted from the light guide and transmitted therethrough such that an intensity profile of the light output from the first major surface of the light guide is uniform among a first location where the anti-wetting component is in contact with the light guide and the reflector and a second location where the anti-wetting component is not in contact with at least one of the light guide and the reflector, wherein the anti-wetting component is a multilayer component comprising a substrate and a textured layer provided on a major surface of the substrate, the textured layer providing the high surface roughness, wherein the textured layer comprises a UV curable resin and transmissive particles are dispersed in the UV curable resin.

2. The lighting assembly of claim 1, wherein at a location of the anti-wetting component:
the first major surface of the anti-wetting component is in contact with the second major surface of the light guide; and
the second major surface of the anti-wetting component is in contact with the reflective surface of the reflector.

3. The lighting assembly of claim 2, wherein at another location of the anti-wetting component:
the first major surface of the anti-wetting component is not in contact with the second major surface of the light guide; and
the second major surface of the anti-wetting component is not in contact with the reflective surface of the reflector.

4. The lighting assembly of claim 1, wherein the anti-wetting component has a light transmissivity of 60 to 90%.

5. The lighting assembly of claim 4, wherein the anti-wetting component has a light transmissivity of 70% to 80%.

6. The lighting assembly of claim 1, wherein the anti-wetting component has a thickness of 50 μm to 300 μm.

7. The lighting assembly of claim 6, wherein the anti-wetting component has a thickness of 50 μm to 100 μm.

8. The lighting assembly of claim 6, wherein the anti-wetting component has a thickness of 150 μm to 200 μm.

9. The lighting assembly of claim 1, wherein the anti-wetting component has a transmission haze of 50% to 90%.

10. The lighting assembly of claim 1, wherein the anti-wetting component has a transmission haze of 80% to 90%.

11. A ceiling or wall fixture, comprising:
the lighting assembly of claim 1; and
a light source configured to edge light the light guide.

12. A lighting assembly, comprising:
a light guide to propagate light by total internal reflection, the light guide comprising first and second opposed major surfaces and an edge surface extending between the major surfaces in a thickness direction, the edge surface comprising a light input region through which light is input into the light guide, the light guide further comprising light extracting elements at at least one of the major surfaces of the light guide, the light extracting elements configured to extract light through at least one of the major surfaces;

a reflector adjacent the second major surface of the light guide, the reflector comprising a reflective surface configured to reflect light extracted from the second major surface of the light guide back into the light guide; and an anti-wetting component interposed between the light guide and the reflector, the anti-wetting component comprising a first major surface juxtaposed the second major surface of the light guide and a second major surface juxtaposed the reflective surface of the reflector, at least one of the major surfaces of the anti-wetting component having a high surface roughness, the high surface roughness being an average surface roughness ranging from 5 μm to 20 μm as measured in an area of 0.001 mm$^2$, the anti-wetting component configured to redirect light extracted from the light guide and transmitted therethrough such that an intensity profile of the light output from the first major surface of the light guide is uniform among a first location where the anti-wetting component is in contact with the light guide and the reflector and a second location where the anti-wetting component is not in contact with at least one of the light guide and the reflector.

13. The lighting assembly of claim 12, wherein the high surface roughness is an average surface roughness ranging from 10 μm to 15 μm as measured in an area of 0.001 mm$^2$.

14. The lighting assembly of claim 13, wherein
the second major surface of the anti-wetting component comprises the high surface roughness; and
the first major surface of the anti-wetting component comprises a surface roughness lower than the high surface roughness.

15. The lighting assembly of claim 14, wherein the surface roughness of the first major surface of the anti-wetting component is an average surface roughness of less than 10 μm as measured in an area of 0.001 mm$^2$.

16. The lighting assembly of claim 12, wherein the anti-wetting component has a light transmissivity of 60 to 90%.

17. The lighting assembly of claim 12, wherein the anti-wetting component has a thickness of 50 μm to 300 μm.

18. A lighting assembly, comprising:
a light guide to propagate light by total internal reflection, the light guide comprising first and second opposed major surfaces and an edge surface extending between the major surfaces in a thickness direction, the edge surface comprising a light input region through which light is input into the light guide, the light guide further comprising light extracting elements at at least one of the major surfaces of the light guide, the light extracting elements configured to extract light through at least one of the major surfaces;

a reflector adjacent the second major surface of the light guide, the reflector comprising a reflective surface configured to reflect light extracted from the second major surface of the light guide back into the light guide; and an anti-wetting component interposed between the light guide and the reflector, the anti-wetting component comprising a first major surface juxtaposed the second major surface of the light guide and a second major surface juxtaposed the reflective surface of the reflector, at least one of the major surfaces of the anti-wetting component having a high surface roughness, the anti-wetting component configured to redirect light extracted from the light guide and transmitted therethrough such that an intensity profile of the light output from the first major surface of the light guide is uniform among a first location where the anti-wetting component is in contact with the light guide and the reflector and a second location where the anti-wetting component is not in contact with at least one of the light guide and the reflector, wherein the anti-wetting component is a multilayer component comprising a substrate, a textured layer provided on a major surface of the substrate, the textured layer providing the high surface roughness, and an additional coating layer on an opposing major surface of the substrate, the additional coating layer providing a surface roughness lower than the high surface roughness.

19. The lighting assembly of claim 18, wherein the anti-wetting component has a light transmissivity of 60 to 90%.

20. The lighting assembly of claim 18, wherein the anti-wetting component has a thickness of 50 μm to 300 μm.

* * * * *